J. T. FAGAN.
MACHINE FOR FORMING LOOPS FOR SUPPORTING FILAMENTS OF ELECTRIC LAMPS.
APPLICATION FILED JAN. 29, 1909.

980,767.

Patented Jan. 3, 1911.
6 SHEETS—SHEET 1.

Fig. 1.

J. T. FAGAN.
MACHINE FOR FORMING LOOPS FOR SUPPORTING FILAMENTS OF ELECTRIC LAMPS.
APPLICATION FILED JAN. 29, 1909.

980,767.

Patented Jan. 3, 1911.

J. T. FAGAN.
MACHINE FOR FORMING LOOPS FOR SUPPORTING FILAMENTS OF ELECTRIC LAMPS.
APPLICATION FILED JAN. 29, 1909.

980,767.

Patented Jan. 3, 1911.

J. T. FAGAN.
MACHINE FOR FORMING LOOPS FOR SUPPORTING FILAMENTS OF ELECTRIC LAMPS.
APPLICATION FILED JAN. 29, 1909.

980,767.

Patented Jan. 3, 1911.

J. T. FAGAN.
MACHINE FOR FORMING LOOPS FOR SUPPORTING FILAMENTS OF ELECTRIC LAMPS.
APPLICATION FILED JAN. 29, 1909.

980,767.

Patented Jan. 3, 1911.

UNITED STATES PATENT OFFICE.

JOHN T. FAGAN, OF CLEVELAND, OHIO, ASSIGNOR TO NATIONAL ELECTRIC LAMP COMPANY, A CORPORATION OF NEW JERSEY.

MACHINE FOR FORMING LOOPS FOR SUPPORTING FILAMENTS OF ELECTRIC LAMPS.

980,767.

Specification of Letters Patent.

Patented Jan. 3, 1911.

Application filed January 29, 1909. Serial No. 474,913.

*To all whom it may concern:*

Be it known that I, JOHN T. FAGAN, a citizen of the United States, residing at Cleveland, in the county of Cuyahoga and State of Ohio, have invented a certain new and useful Improvement in Machines for Forming Loops for Supporting Filaments of Electric Lamps, of which the following is a full, clear, and exact description.
The present invention is directed to mechanism for automatically forming the loops which are used as supports for the filament in certain modern types of electric lamp. These metallic loops are of exceedingly fine wire which may or may not be metallic, and have heretofore been constructed by hand with considerable variation in the quality of the work done, according to the skill and experience of the operator.
It has been my purpose to provide mechanism whereby these loops may be formed automatically without the necessity for any manipulation by an operator, and it has been a further object to provide such a mechanism as to require no attention on the part of the operator other than such general supervision as is usually had over automatic machinery.

The above objects and other desirable advantages it will be seen are attained by that embodiment of my invention described in the following specification with reference to the accompanying drawings, in which;

Fig. 6 is a section on the line 6—6 of Fig. 4 looking in the direction of the arrow.

The wires from which the loops are formed by this machine are as a rule of such very fine diameter as to be more properly described by the word "filament", but this expression will not be used for the purpose owing to the fact that the word "filament" has acquired a special meaning in connection with electric lamps and it is therefore not advisable to cause confusion by using a nomenclature which might be confusing. Where I use the word wire, however, in describing the material worked up into the form of loops, it must be borne in mind that the article in question is light and of small diameter and must be handled in accordance with its character. This statement is necessary in order to make clear the delicate character of certain portions of the apparatus.

Figure 1:
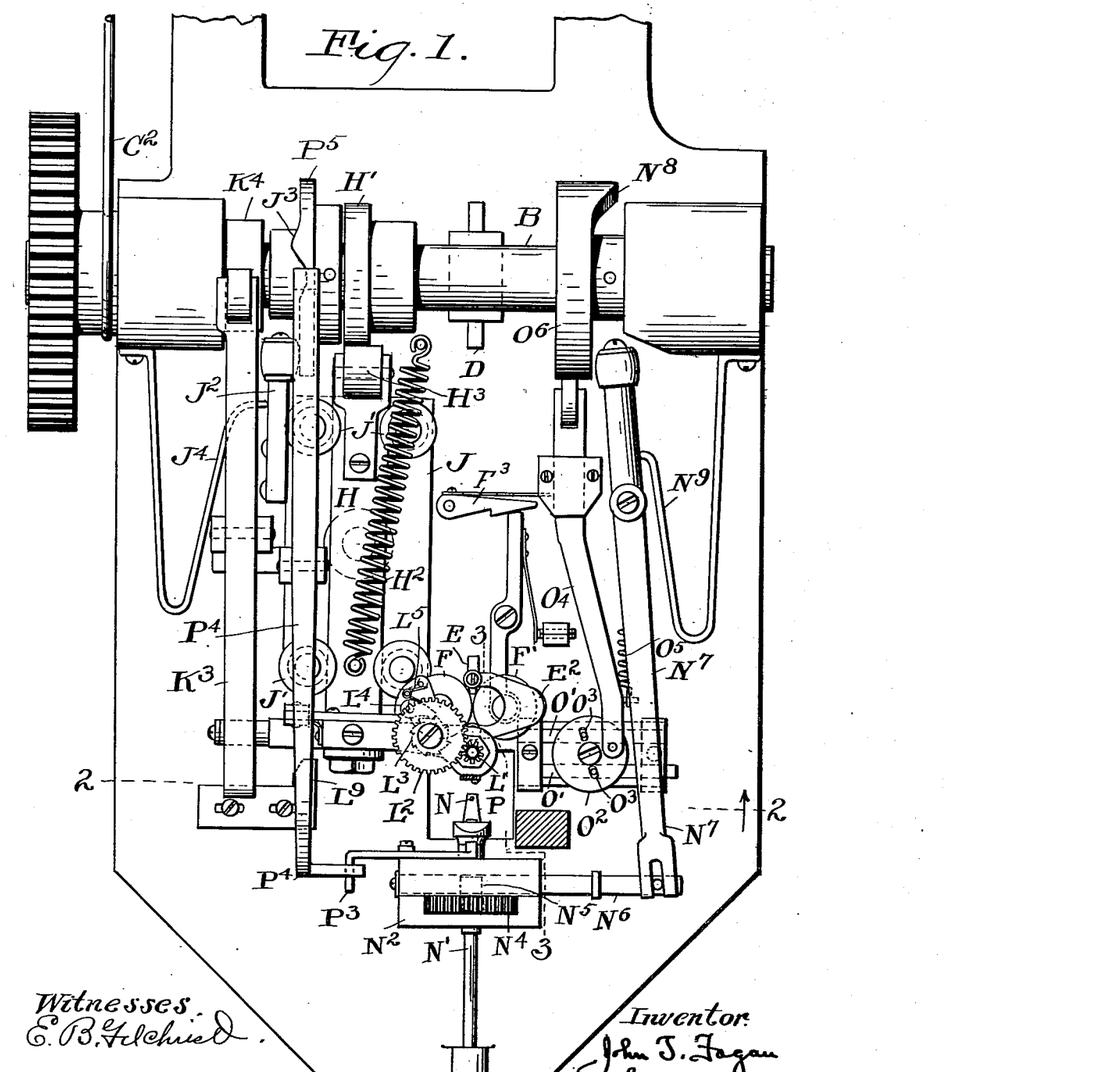
Figure 1 is a top plan view of the apparatus exclusive of the reel holder from which the wire is supplied, the driving shaft being also removed for the purpose of permitting the operating parts to be more clearly shown.
Figures 2, 3:
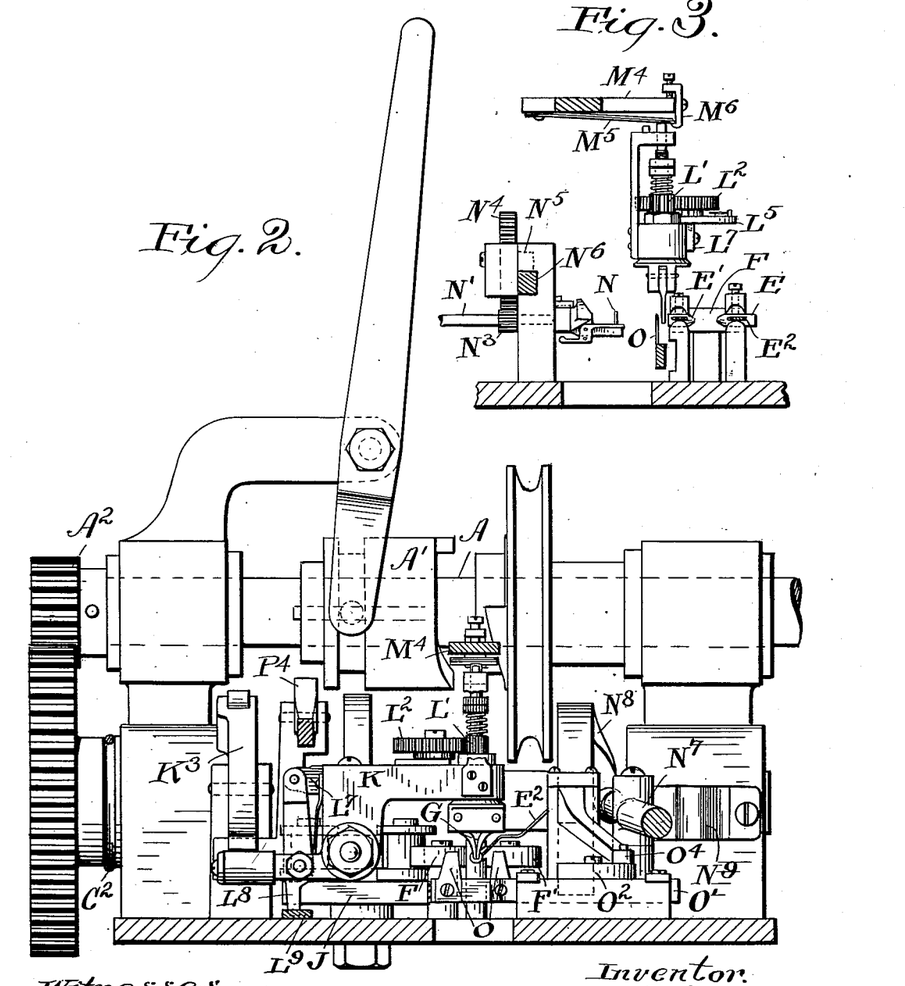
Fig. 2 is a front elevation of the apparatus taken from the line 2—2 of Fig. 1.
Fig. 3 is a detail longitudinal section taken on the line 3—3 of Fig. 1 illustrating the loop forming portion of the apparatus.
Figure 4:
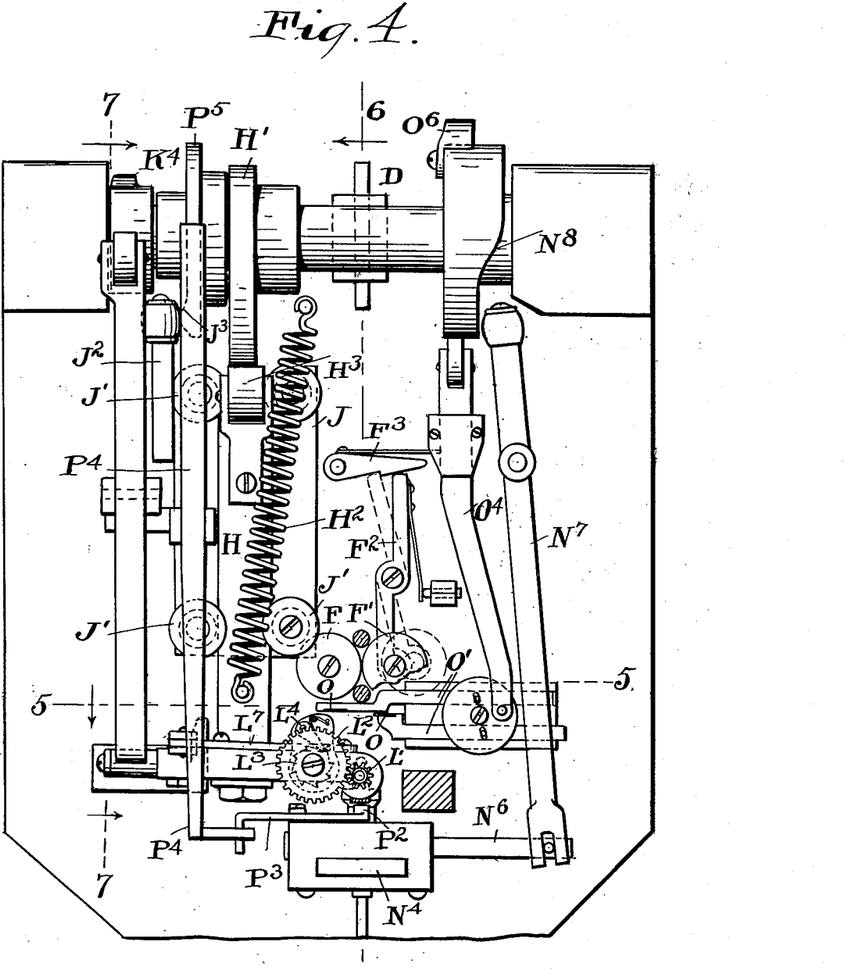
Fig. 4 is a plan view of the more important part of the operating mechanism in a position in advance of that shown in Figs. 1, 2 and 3.
Figure 5:
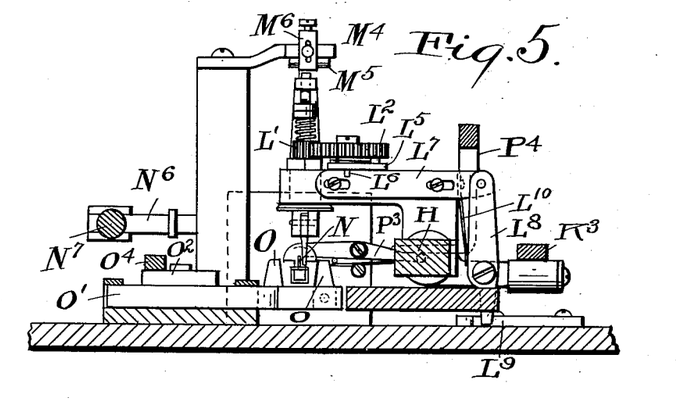
Fig. 5 is a section on the line 5—5 of Fig. 4 looking in the direction of the arrow.
Figure 6:
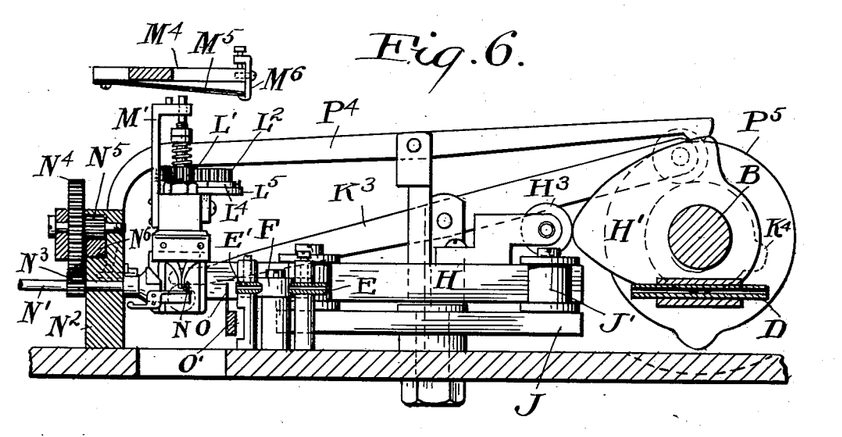
Figure 7:
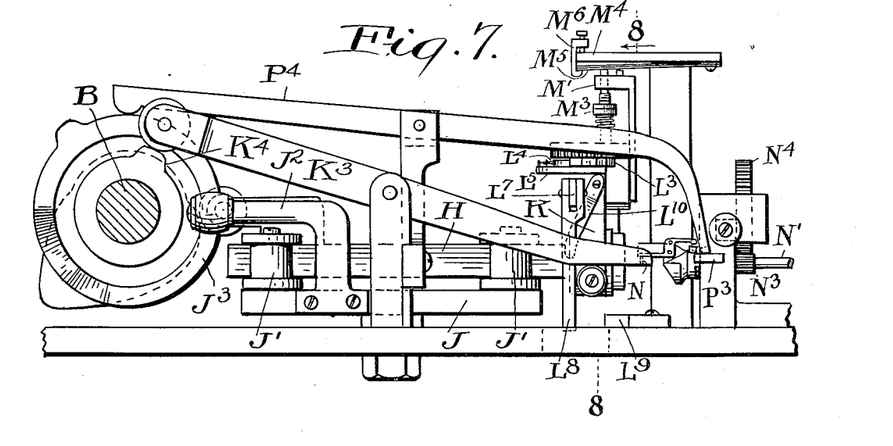
Fig. 7 is a side elevation taken looking from the line 7—7 in Fig. 4, but with the mechanism advanced to a further position.
Figure 8:
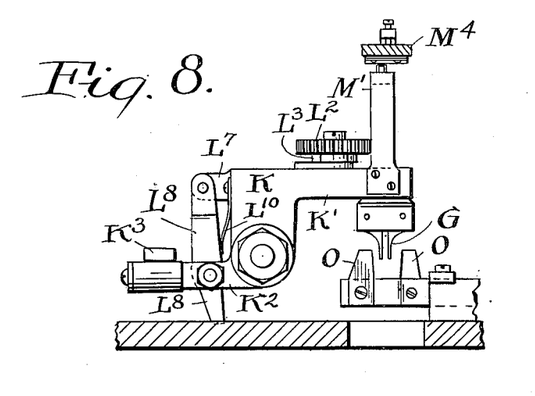
Fig. 8 is a detail elevation looking from the line 8—8 of Fig. 7 in the direction of the arrow.
Figure 12:
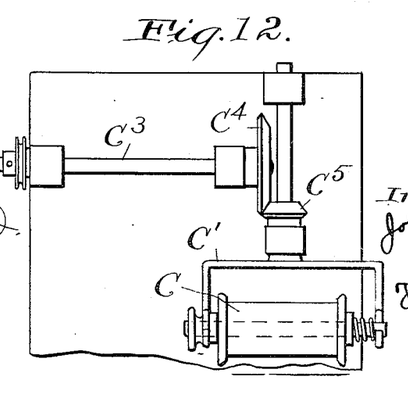
Figs. 12 and 13 are respectively plan and side elevations of that portion of the apparatus by which the reel is manipulated during the feed of wire therefrom.
Figure 13:
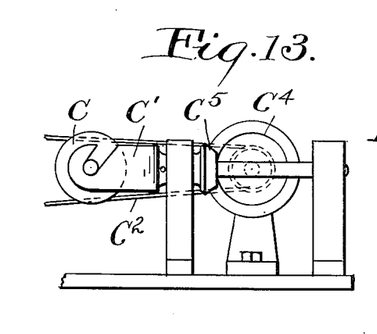

The apparatus as a whole is mounted on a single bed plate having journal boxes secured thereto in which is mounted an operating shaft A receiving rotary motion through the medium of a clutch device A' and transmitting motion by means of a spur gear $A^2$ to a cam shaft B also suitably journaled in bearings on the bed plate. The wound ball of wire from which is supplied the material, is held on a spool C mounted in a rotatable fork C' journaled at the rear end of the bed plate. (See Figs. 12 and 13.) This fork is designed to rotate constantly as the machine is in operation for the purpose of giving the wire strand fed from the ball a twist in one direction. The purpose of this twisting action is in effect to compensate for the twist given to the strand during the formation of the loop, as will subsequently be described. The rotation of the holding fork C' is secured by means of a driving rope $C^2$ extending between the cam shaft B and a jack shaft $C^3$ at the rear end of the base plate, which jack shaft has a beveled gear $C^4$ meshing with a similar gear $C^5$ on a stem of the fork. The wire is led forward from the spool through an intermediate guide D to a pair of short guide tubes E, E' held together by means of a connecting yoke $E^2$ at the forward end of the machine. These two guides and their connecting yoke are best illustrated in Figs. 1, 3 and 6. In between these two guiding tubes the wire is passed between a pair of guide rolls F, F' for the purpose of causing it to be fed with accuracy and steadiness. One of these guide rolls F' is mounted on a vertical spindle which in turn is mounted in the end of a swinging arm $F^2$ so that it may be moved to one side, as indicated by dotted lines in Fig. 4, in order to clear the way for threading the wire through the guide tubes. A suitable spring pawl $F^3$ is pivoted on the bed-plate for the purpose of retaining the said arm $F^2$ carrying the guide roll F' out of operating position during the threading of the wire through the guide tubes. This is a mere convenience and is not essential to the effective operation of the machine. The wire being threaded through the guides, as above described, and projecting a slight distance through the same is in position to be carried through the loop forming operation.

Figures 9, 14:
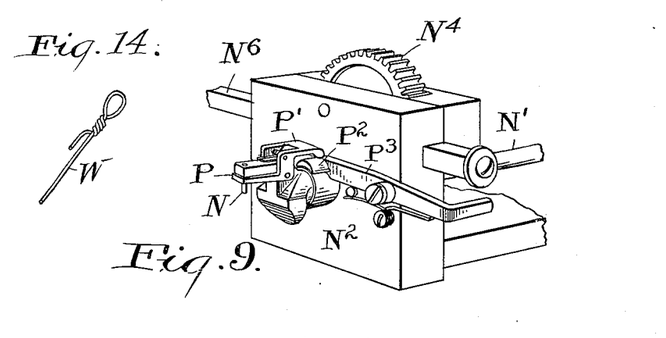
Fig. 9 is a perspective view looking from the inside of the machine showing the twisting mechanism and the stripping mechanism therefor.
Fig. 14 is an enlarged view of the loop formed by the apparatus.

The specific operation below described includes a procedure wherein the end of the wire is caught by a pair of tongs carried by a shifting table and operated by suitable mechanism for the purpose of carrying the wire forward and drawing it around a peg in front of the guides and back again, so that the end of the wire is doubled on itself into a U-shaped bend, the peg being then given a quick twisting turn for the purpose of twisting the legs of the said U bend and forming a loop, this loop being subsequently cut from the main wire and stripped from the twisting peg, after which the entire operation is repeated. The loops produced are substantially of the shape shown in Fig. 14. The gripping tongs G are, as above stated, carried by a shifting table H mounted on an oscillatory cradle J. The said table is held in a slideway preferably between anti-friction rollers J', as shown, on said cradle so that it may have a free backward and forward movement under the action of a cam H' mounted on the cam shaft and a tension spring $H^2$ fastened to the bed plate; the cam pushing the table forward, the spring drawing it backward. If desired, an anti-friction roller $H^3$, such as shown, may be carried by the table adjacent to the cam to receive the thrust of the latter. At the forward end of the table is mounted a transverse rock arm K, one extension K' of which carries the gripping tongs and certain operating mechanism therefor, the other extension $K^2$ being used in connection with an operating lever $K^3$, subsequently to be described, for giving the arm a motion causing the gripping tongs to move vertically. The said rock arm K is pivotally mounted on the shifting table, and on account of an overbalancing in weight, has a tendency to drop on the side on which the gripping tongs are mounted. This dropping movement is restrained, however, by the operating lever $K^3$ beneath the end of which the other extension $K^2$ of the rock arm passes. This operating lever is journaled on the base plate and has a vertical rocking motion, one end of it being controlled by a cam $K^4$ mounted on the cam shaft. The end $K^2$ of the rocking arm, under this operating lever, is preferably provided with an anti-friction roller and is free to move back and forth beneath said lever in accordance with the backward and forward movement of the shifting table, but it will be plain that whenever the cam controlling the operating lever comes into action during the rotation of the cam shaft, the rock arm carrying the gripping tongs will be moved so as to raise the gripping tongs and hold them in such raised position independently of the backward and forward movement of the shifting tables and the gripping mechanism as a whole. A proper relation between these movements can, of course, be easily attained by the timing of the cams controlling the two movements. In addition to the forward and backward reciprocation and the vertical reciprocation, the gripping tongs have a sidewise movement attained by the oscillation of the cradle J on which the shifting table is mounted. It will be observed that this cradle is pivotally mounted on the base plate and has at the rear end thereof an extension $J^2$ carrying an anti-friction roller bearing against a cam $J^3$ suitably mounted on the cam shaft. The said cam is on the side face of a disk in order that the sidewise shifting action may be achieved. This cam acts in opposition to a stiff leaf spring $J^4$ secured to one of the journal boxes of the cam shaft and tending to throw the rear end of the cradle inward. It is obvious with the proper timing of this cam $J^3$ with relation to the two cams H', $K^4$ previously mentioned as controlling the forward movement of the shifting table and the vertical movement of the rock arms carrying the gripping tongs, the desired path of movement of the said tongs in any direction throughout the three dimensions of space may be achieved, and it will thus become possible in conjunction with certain mechanisms, subsequently to be described, for opening and closing the tongs at the right moment, for the tongs to grasp the end of the wire projecting from the guides and carry it through any desired path, that path being determined absolutely by the contour and relative timing of the cams in question.

Figure 10:
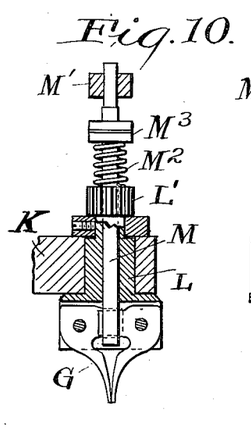
Figs. 10 and 11 are enlarged vertical sections at right angles to each other showing the structure of the gripping jaws by which the wire is drawn forward and about the twisting device.
Figure 11:
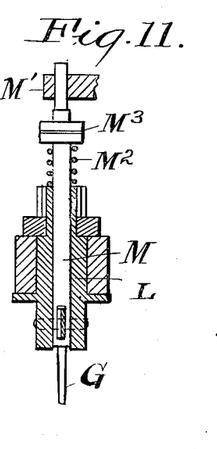

The mechanisms for opening and closing the gripping tongs at the proper time will be best understood by reference to Figs. 3, 6, 10 and 11. Referring particularly to Figs. 10 and 11, it will be seen that the tongs are pivoted in a vertical cross slot in the lower end of a spool L rotatably mounted in the end of the rock arm K. The reason for having this spool rotatable and the mechanism for accomplishing the rotation will be subsequently explained. Extending centrally through the spool is a vertically reciprocatable rod M guided at its upper end by a bracket member M' secured to and rigid with the rock arm in which the spool is mounted. The said rod is under constant upward tension by reason of a coiled spring $M^2$ interposed between a collar $M^3$ on the rod and the mechanism below. The lower end of the rod has a transverse slot and each pivoted tong member has an arm projecting into said slot, the dimensions being such as to permit a free working movement of the tongs. The upward movement of the rod will obviously draw the gripping members of the tongs closed and a downward movement of the rod will spread the gripping members apart.

Referring now to Figs. 3 and 6 particularly, it will be seen that as the gripping mechanism is moved back and forth in accordance with the movement of the shifting table, the said gripping mechanism will be beneath an overhanging shelf $M^4$ disposed but a short distance above the upper end of the tong-operating rod. It will be plain, therefore, that when the rock arm carrying the gripping mechanism is moved by its operating lever to throw the gripping mechanism upward, the said tong rod will bear against the overhanging shelf and consequently be pressed downward relatively to the rock arm and the mechanism carried thereby. This will result in the tongs being held open so long as the rod is held up against the shelf. For effective practical operation it is preferable that the under face of the shelf should be provided with a stiff leaf spring $M^5$ instead of presenting an absolutely unyielding surface to the end of the rod. This spring is retained in proper place by any suitable device such as the adjustable hook $M^6$ and is given the proper inclination for the peculiar path of movement of the tongs so as to determine their opening and closing movements at the proper points.

In addition to the gripping movement and the movement in the three dimensions of space above outlined, I desire to give the tongs capacity for rotation, since in accordance with the design of the particular mechanism here disclosed, it is desirable that a semi-rotation should be had during the formation of each loop. This desideratum arises from the fact that the end of the wire held by the tongs is, for the formation of a loop, led forward and around a vertical peg or pin N and back again along the line from which it was led, thus forming a U-shaped loop with the pin N in the eye of the loop. The securing of a semi-rotation of the gripping tongs as they travel around the pin with the wire will prevent a bend or kink being permitted in the wire at the tongs by reason of the change of direction of relative pull of the wire on the tongs after the latter has drawn the wire around the pin. For the purpose of securing this semi-rotation with each forward advance of the tongs leading the wire around the pin, I provide a pinion L' rigid with the tong rod M and meshing with a second pinion $L^2$ journaled on the rock arm and having a ratchet $L^3$ secured thereto. A spring-pressed pawl $L^4$ (see Fig. 1) mounted on an oscillatory plate $L^5$ engages said ratchet, the said oscillatory plate having a pin $L^6$ engaging a slot in a reciprocatable horizontal slide bar $L^7$ held on the side of the rock arm K carrying the gripping mechanism. The said slide bar is reciprocated by means of a lever $L^8$ pivoted at one end thereof and journaled on the branch $K^2$ of the rock arm, the said lever having its lower end riding against the side of a cam plate $L^9$ secured to the base plate of the machine. The said cam plate is opposed in its action by a leaf spring $L^{10}$ secured to the rock arm and bearing against the lever, and the said cam is so disposed that the movement of the slide bar $L^7$, by which the pawl and ratchet transmit rotary motion to the tong rod, takes place when the shifting table H is at the forward end of its path of movement and the oscillating cradle J is moving to carry the tongs around the end of the pin upon which the loop is formed. The throw of the pawl and the number of ratchet teeth and the pinions are all so proportioned as to give the tongs a rotation of but 180 degrees as they pass around the pin, thus maintaining the direction of pull of the wire always directly behind the tongs throughout their entire path of travel both forward and backward.

From the mechanism above described it will be seen that it is possible for the tongs in elevated position to be opened, descend to the proper level and closed, grasping the end of the wire projecting from the guides, and to then move forward leading said wire around a pin and drawing it back parallel with the forward path of movement, permitting a perfect U-shaped bend in the end of the wire without any additional kinks at the tongs or elsewhere. If the tongs be now permitted to remain temporarily at rest, while holding the end of the wire, and the pin about which the bend is made be then rotated more or less rapidly, the end of the wire and the body thereof will be twisted together to form a shank between the said pin and the tongs so that a permanent loop will be formed, the eye of the loop remaining on the said pin. I provide means for accomplishing this purpose, as will appear below, and I further provide means for automatically cutting this loop and its twisted stem off from the main body of the wire after the loop is formed.

At this point I would call attention to the fact that the constant rotation of the yoke carrying the feed reel, mentioned in the beginning of the specification, is designed to compensate for the twist given the stock or main body of the wire during the formation of the twisted loop shank just described.

For the purpose of effectively rotating the pin on which the loop is formed, I preferably mount this pin on the end of a rotating shaft N' which is journaled in an upright bearing block N² in the forward end of the machine, the said shaft being disposed parallel with and approximately in alinement with the direction of feed of the wire. The said twisting shaft has a pinion N³ thereon meshing with a spur gear N⁴ which is also journaled in said bearing block and designed to receive rotation through the medium of a pinion N⁵ rigid therewith and meshing in a rack bar N⁶ slidingly mounted in the said block. The movement of the rack bar back and forth will cause a corresponding rotation of the twisting shaft in each direction, and the movement of this rack bar is attained by means of an oscillating lever N⁷ pivotally mounted on the frame and controlled by a cam N⁸ on the side face of a disk secured to the cam shaft, which cam is opposed in its action by a stiff leaf spring N⁹ secured to the frame. Obviously, by the last named cam, the twisting shaft may be given a speedy rotation as soon as the U-shaped bend on the wire end is formed on the twisting pin N, which is, during the formation of the bend, held in an upright position as shown in Fig. 3. I so time the cam and so adjust the connections that, when the twisting action and formation of the loop is completed, the twisting pin will be pointing vertically downward so that the formed loop may drop therefrom as soon as it has been cut from the end of the wire and the gripping tongs have released their hold. After the severance of the formed loop from the end of the wire W and the stripping of the same from the twisting pin, the rack will be caused to move in the proper direction to restore the said pin to its upright position in time for the formation of the next loop.

The mechanism for severing the formed loop from the end of the wire comprises a pair of vertically disposed knives O, O located on the opposite sides of the said wire as it emerges from the guides, each of these knives being rigidly held on the end of a pair of bars O', O' controlled by a common disk O². It will be observed that these bars lie parallel and side by side so that pins O³ projecting from the upper face thereof may enter slots in the said disk which is rotatably mounted between the bars. An oscillatory movement on the part of the disk will cause the bars to move in opposite directions and this oscillatory movement is obtained by a reciprocating rod O⁴ pivoted to the disk and held by a spring O⁵ against the peripheral cam face O⁶ of the same disk member carrying the cam N⁸. The face of said disk is provided at the proper points with undulations (not shown) for operating the knives at the proper time. The tension of the spring O⁵ referred to will cause the knife bars and the knives carried thereby to resume their normal and separated position as soon as the cam surface controlling them will permit. It was stated above that this severance of the loop from the stock takes place while the twisting pin is occupying an inverted position, so that the loop will normally fall from the pin without difficulty. In order, however, to insure the proper stripping of the loop from the pin, I have provided a stripper plate P pivotally secured to the end of the twisting shaft and having a perforation in the toe thereof through which the twisting pin extends. The heel P' of this stripper plate extends beyond the pivotal point and an outward movement of the heel away from the shaft will cause the toe of the plate to ride along the twisting pin so as to remove any loop that may be thereabout. The said heel is spaced apart from the body of the shaft to such an extent as to permit the heel, during rotation of the shaft, to pass over a finger P² on the end of an oscillating arm P³ pivotally mounted on the same block N² in which the twisting shaft is mounted. Springs of suitable construction hold the stripping plate and the oscillating arm normally in operative position. A vertically oscillating lever P⁴ mounted on the bed plate and operated by a cam on the peripheral surface P⁵ of the same cam disk which, by means of the cam J³, controls the oscillation of the cradle, serves to operate the stripping plate at that moment when the twisting pin, after having ceased rotation, is held in an inverted position and the loop is cut from the stock. After the loop has been severed and stripped from the twisting pin as described, the cam N⁸ controlling the rotation of the twisting shaft, then causes the said shaft to immediately rotate backwardly to its original position in which the twisting pin is directed vertically upward ready for the formation of a second U bend in the end of the wire stock preparatory to forming a second loop. The gripping tongs, still held open by reason of the pressure of their operating rod M against the leaf spring M⁵ beneath the overhanging shelf M⁴, are then moved, by the table on which they are supported, to a position immediately over the end of the wire stock projecting from the guides. The cam K⁴ controlling the dropping movement of the tongs then permits them to lower to the point where they are in position to grip the end of the wire, and this lowering movement simultaneously frees the operating rod from contact with the shelf above so that the tong fingers are drawn together by the spring M² controlling them, thus gripping the wire preparatory to a second loop-forming movement such as described above.

Having thus described my invention, I claim:

1. Mechanism for forming loops from stock, comprising a form and means for placing the stock about the form, means for securing relative rotation between the bent stock and the form, and means for giving axial rotation to the stock beyond the loop in the proper direction to relieve the tendency of the act of forming the loop to twist the body of the stock beyond the loop.

2. Mechanism for forming loops from stock of the character described comprising means for holding a spool of the stock, a pin, gripping means for holding the end of the stock, means for moving the gripping means around said pin to form a U-bend in the stock, and means for giving the pin a rotation relative to the stock.

3. Automatic mechanism for forming loops from stock of the character described comprising means for holding a spool of the stock, a pin, gripping means for holding the end of the stock, means for moving the gripping means around said pin to form a U bend in the stock, and means for giving the pin a rotation relative to the stock, and means for automatically severing the loop thus formed from the stock.

4. Automatic mechanism for forming loops from the stock of the character described comprising gripping means for the stock, means for giving said gripping means a forward movement, means for giving it a lateral movement and means for giving it a turning movement during the lateral movement, and means for giving it a reverse movement substantially parallel to its forward movement and in a path adjacent thereto.

5. Automatic mechanism for forming loops from the stock of the character described comprising gripping means for the stock, means for giving said gripping means a forward movement, means for giving it a lateral movement and means for giving it a turning movement during the lateral movement, and means for giving it a reverse movement substantially parallel to its forward movement and in a path adjacent thereto, a pin located within the path of movement of the gripping means, and means for twisting said pin relatively to the stock.

In testimony whereof, I hereunto affix my signature in the presence of two witnesses.

JOHN T. FAGAN.

Witnesses:
   H. R. SULLIVAN,
   J. M. WOODWARD.